(12) United States Patent
Fujimi

(10) Patent No.: US 9,169,871 B2
(45) Date of Patent: Oct. 27, 2015

(54) CAGE AND METHOD OF ASSEMBLING CAGE

(71) Applicant: JTEKT CORPORATION, Osaka-shi, Osaka (JP)

(72) Inventor: Takaichi Fujimi, Fujiidera (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/312,134

(22) Filed: Jun. 23, 2014

(65) Prior Publication Data

US 2015/0010258 A1    Jan. 8, 2015

(30) Foreign Application Priority Data

Jul. 3, 2013    (JP) ................. 2013-139671

(51) Int. Cl.
| | |
|---|---|
| F16C 33/38 | (2006.01) |
| F16C 43/06 | (2006.01) |
| B21D 53/12 | (2006.01) |
| F16C 43/04 | (2006.01) |
| F16C 19/06 | (2006.01) |

(52) U.S. Cl.
CPC ......... *F16C 33/3875* (2013.01); *F16C 33/3831* (2013.01); *F16C 19/06* (2013.01); *F16C 43/04* (2013.01); *F16C 43/06* (2013.01); *Y10T 29/49691* (2015.01)

(58) Field of Classification Search
CPC .............. F16C 33/541; F16C 33/3837; F16C 33/3862; F16C 33/3875; F16C 43/065; F21D 53/12; F21J 15/00; Y10T 29/49691

USPC ......... 384/523, 526–528, 530, 577–479, 609, 384/614, 577–579, 537; 411/500, 526; 29/525.06, 898.067

See application file for complete search history.

(56) References Cited

U.S. PATENT DOCUMENTS

| | | | | | |
|---|---|---|---|---|---|
| 2,742,332 | A | * | 4/1956 | Cobb | 384/627 |
| 2,861,849 | A | * | 11/1958 | Case | 384/527 |
| 2,898,798 | A | * | 8/1959 | Carno | 411/80.2 |
| 3,203,304 | A | * | 8/1965 | Rapata | 411/41 |
| 3,471,208 | A | * | 10/1969 | Vannest | 384/530 |
| 3,649,093 | A | * | 3/1972 | Muratore et al. | 384/463 |
| 3,797,755 | A | * | 3/1974 | Saisho | 411/45 |

(Continued)

FOREIGN PATENT DOCUMENTS

| | | | | |
|---|---|---|---|---|
| JP | 07208423 | A * | 8/1995 | F16B 19/10 |
| JP | A-2008-64221 | | 3/2008 | |
| JP | A-2010-180953 | | 8/2010 | |

*Primary Examiner* — Marcus Charles
(74) *Attorney, Agent, or Firm* — Oliff PLC

(57) ABSTRACT

A cage that includes a first and a second annular member made of resin that has a plurality of through-holes that are located at intervals in a circumferential direction and each of the first and second annular member having axial end faces. The cage also includes pipe members each having a portion that has a plurality of slits that are located at intervals in a circumferential direction. The pipe portions are passed through the through-holes of the first and second annular members. Fixed members of the cage each have a shaft portion passed through one of the pipe members. An outer face of each pipe member is engaged with both an inner peripheral face that defines a corresponding one of the through-holes of the first annular member and an inner peripheral face that defines a corresponding one of the through-holes of the second annular member, with a frictional force.

2 Claims, 2 Drawing Sheets

(56) References Cited

U.S. PATENT DOCUMENTS

| | | | |
|---|---|---|---|
| 4,405,272 A * | 9/1983 | Wollar | 411/41 |
| 4,626,113 A * | 12/1986 | Forknall et al. | 384/530 |
| 5,388,918 A * | 2/1995 | Williams | 384/530 |
| 5,568,675 A * | 10/1996 | Asami et al. | 24/453 |
| 7,507,028 B2 * | 3/2009 | Markle | 384/530 |
| D635,451 S * | 4/2011 | Sekine | D8/382 |
| 8,556,519 B2 * | 10/2013 | Bohr et al. | 384/572 |
| 2009/0220181 A1 * | 9/2009 | Yamada et al. | 384/513 |
| 2012/0210557 A1 * | 8/2012 | Jones et al. | 29/525.06 |

* cited by examiner

CAGE AND METHOD OF ASSEMBLING CAGE

INCORPORATION BY REFERENCE

The disclosure of Japanese Patent Application No. 2013-139671 filed on Jul. 3, 2013 including the specification, drawings and abstract, is incorporated herein by reference in its entirety.

BACKGROUND OF THE INVENTION

1. Field of the Invention

The invention relates to a cage of a rolling bearing, and relates also to a method of assembling a cage of a rolling bearing.

2. Description of the Related Art

As a conventional cage of a rolling bearing, there is a cage of a ball bearing described in Japanese Patent Application Publication No. 2008-64221 (JP 2008-64221 A).

The cage includes a first annular member made of resin, a second annular member made of resin, and a plurality of rivets made of metal. The first annular member has a plurality of cuts each having a semi-circular section. Each cut extends through the first annular member in its radial direction, and opens toward only one side in its axial direction. The cuts are located at intervals in the circumferential direction of the first annular member. The second annular member is identical to the first annular member.

The first annular member and the second annular member are placed on each other such that the cuts of the first annular member, each having a semi-circular section, and the cuts of the second annular member, each having a semi-circular section, constitute holes each having a circular section. The holes each having a circular section constitute pockets that accommodate balls. Portions of the first and second annular members, which are located between the pockets adjacent to each other in the circumferential direction, constitute cage bars.

The first and the second annular members have rivet insertion holes at portions corresponding to the cage bars. When the first and second annular members are placed on each other to constitute the pockets, the rivet insertion holes of the first annular member and the rivet insertion holes of the second annular member are communicated with each other.

The rivets are passed through the rivet insertion holes of the first annular member and the rivet insertion holes of the second annular member. The rivets couple the first annular member and the second annular member to each other. Specifically, the end portions of the rivets are swaged. One end portion of each rivet is engaged with a portion of the first annular member, which is on the opposite side of the first annular member from the second annular member in the axial direction. Further, the other end portion of each rivet is engaged with a portion of the second annular member, which is on the opposite side of the second annular member from the first annular member in the axial direction.

The conventional cage includes the first and second annular members made of resin, and the rivets made of metal of which the linear expansion coefficient is higher than that of resin. As a result, under a high-temperature environment, the rivets expand more than the first and second annular members. This may cause a possibility that forces with which the rivets press inner peripheral faces that define the rivet insertion holes of the first and second annular members will be excessively large, and stresses generated in the first and second annular members will be excessively high.

On the other hand, under a low-temperature environment, the rivets contract more than the first and second annular members. This may cause a possibility that forces with which the rivets press the first and second annular members will fall below a desired magnitude of force.

SUMMARY OF THE INVENTION

One object of the invention is to provide a cage configured such that high stresses are less likely to be generated in first and second annular members made of resin under a high-temperature environment, and engagement between the first and second annular members is less likely to be loosened under a low-temperature environment, and to provide a method of assembling the cage.

An aspect of the invention relates to a cage including: a first annular member made of resin, having a plurality of through-holes that are located at intervals in a circumferential direction of the first annular member, and having one-side axial end face located on one side in an axial direction of the first annular member; a second annular member made of resin, having a plurality of through-holes that are located at intervals in a circumferential direction of the second annular member, and having the other-side axial end face that is located on the other side in the axial direction and that contacts the one-side axial end face of the first annular member; pipe members each being a single-piece member, and each having a pipe portion that has a plurality of slits that are located at intervals in a circumferential direction of the pipe member, the slits extending in an axial direction of the pipe member and the slits extending through the pipe portion in a radial direction of the pipe member, and the pipe portions being passed through the through-holes of the first annular member and the through-holes of the second annular member; and fixed members each having a shaft portion passed through any one of the pipe members in the axial direction of the pipe member, a first fixed portion that contacts one axial end portion of the pipe member and that is fixed to one-side axial end face of the second annular member, and a second fixed portion that contacts the other axial end portion of the pipe member and that is fixed to the other-side axial end face of the first annular member. An outer face of each of the pipe members is engaged with both an inner peripheral face that defines a corresponding one of the through-holes of the first annular member and an inner peripheral face that defines a corresponding one of the through-holes of the second annular member, with a frictional force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, example embodiments of the invention will be described with reference to the accompanying drawings.

Figure 1:
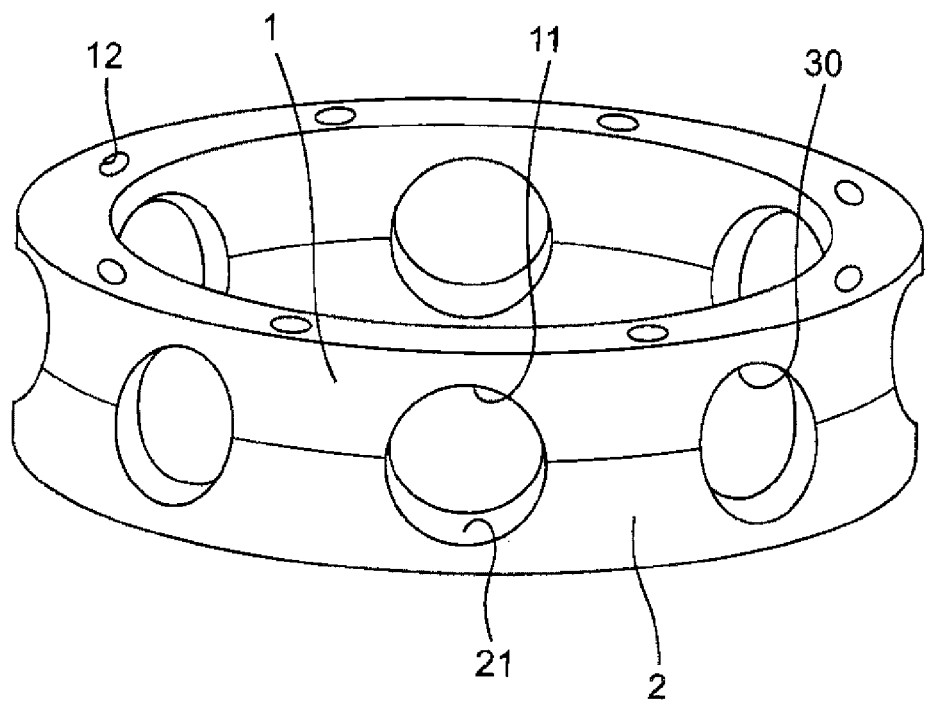
FIG. 1 is a perspective view illustrating first and second annular members of a cage according to an embodiment of the invention.

FIG. 1 is a perspective view illustrating first and second annular members 1, 2 of a cage according to an embodiment of the invention.

The cage is a cage of a deep groove ball bearing. As illustrated in FIG. 1, the cage includes the first annular member 1 and the second annular member 2. The first annular member 1 is made of resin. The second annular member 2 is made of the same kind of resin as that of the first annular member 1. As illustrated in FIG. 1, the first annular member 1 has a plurality of cuts 11 and a plurality of through-holes 12. Each cut 11 has a semi-circular shape as viewed from the outside in the radial direction of the first annular member 1. The cuts 11 open toward both sides in the radial direction while opening toward only one side in the axial direction. The cuts 11 are located at intervals in the circumferential direction of the first annular member 1.

The through-holes 12 are located between the cuts 11 that are adjacent to each other in the circumferential direction (each through-hole 12 is located between corresponding two of the cuts 11 that are adjacent to each other in the circumferential direction). As illustrated in FIG. 1, the through-holes 12 extend in the axial direction through the first annular member 1 from one axial end face of the first annular member 1 to the other axial end face thereof. As illustrated in FIG. 1, each cut 11 of the first annular member 1, having a semi-circular section, and any one of the cuts 21 of the second annular member 2, having a semi-circular section, constitute a hole that extends through the cage in the radial direction. One-side axial end face 15 of the first annular member 1 and the other-side axial end face 25 of the second annular member 2 are in contact with each other in the axial direction such that the through-holes 12 of the first annular member 1 are aligned with through-holes 22 of the second annular member 2 in the axial direction. The holes that extend through the cage in the radial direction each have a generally circular shape as viewed from the outside in the radial direction. The holes each having a generally circular shape as viewed from the outside in the radial direction constitute pockets 30 that accommodate balls that serve as rolling elements. The first annular member 1 and the second annular member 2 of the cage are engaged with each other by engaging members the number of which is the same as the number of the through-holes 12 of the first annular member 1.

Figure 2:
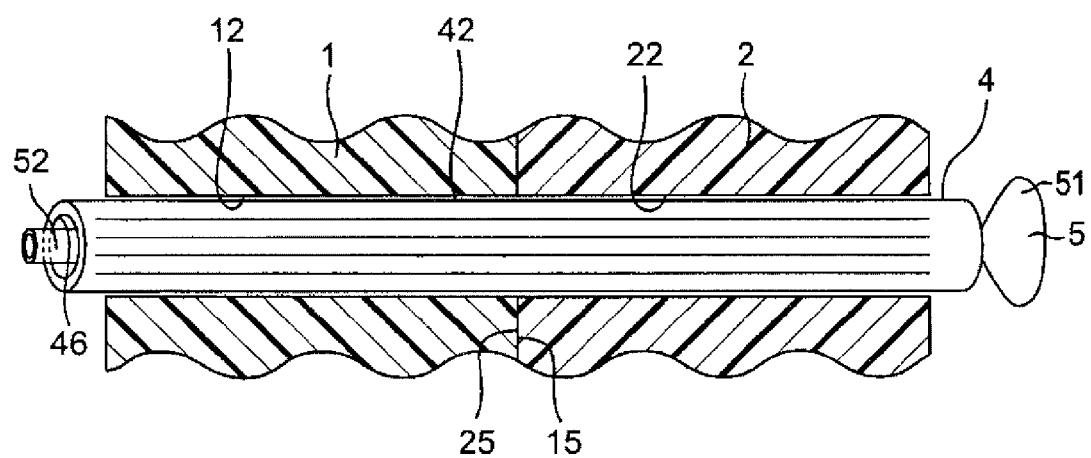
FIG. 2 is a schematic sectional view illustrating the state where a member, which engages the first and second annular members with each other, is passed through through-holes of the first and second annular members when one-side axial end face of the first annular member and the other-side axial end face of the second annular member are in contact with each other in the axial direction.

FIG. 2 is a schematic view illustrating the configuration of each engaging member. Specifically, FIG. 2 is a schematic sectional view illustrating the state where the engaging member is passed through the through-holes 12, 22 of the first and second annular members 1, 2 when the one-side axial end face 15 of the first annular member 1 and the other-side axial end face 25 of the second annular member 2 are in contact with each other in the axial direction. FIG. 2 is a schematic sectional view taken along a plane that extends through the central axis of the through-hole 12 of the first annular member 1 and the central axis of the first annular member 1.

Figure 3:
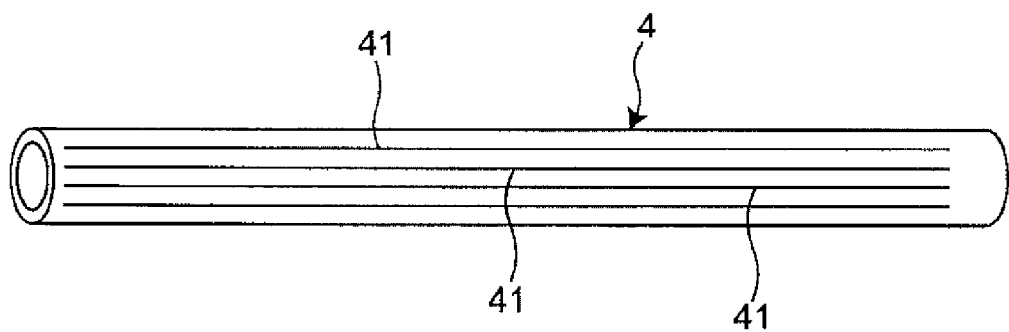
FIG. 3 is a perspective view of a pipe member.

As illustrated in FIG. 2, the engaging member includes a pipe member 4 and a rivet 5 that is an example of a fixed member. FIG. 3 is a perspective view of the pipe member 4. As illustrated in FIG. 3, the pipe member 4 is a metal cylindrical member having a plurality of slits 41. The slits 41 extend in the axial direction. The slits 41 extend through the pipe member 4 in its radial direction. The slits 41 are located at intervals in the circumferential direction of the pipe member 4.

As illustrated in FIG. 2, the outside diameter of an outer peripheral face 42 of the pipe member 4 is slightly smaller than the inside diameter of the inner peripheral face that defines the through-hole 12 of the first annular member 1. The axial length of the pipe member 4 is longer than the sum of the axial length of the first annular member 1 and the axial length of the second annular member 2.

As illustrated in FIG. 2, the rivet 5 has a head 51 and a shaft portion 52. The outside diameter of the shaft portion 52 of the rivet 5 is smaller than the inside diameter of the inner peripheral face of the pipe member 4, which defines a through-hole 46 of the pipe member 4. The axial length of the shaft portion 52 of the rivet 5 is longer than the axial length of the pipe member 4.

The cage is assembled according to the following procedure.

First, there are prepared the first and second annular members 1, 2 illustrated in FIG. 1, the same number of the pipe members 4 illustrated in FIG. 3 as that of the through-holes 12 of the first annular member 1, and the same number of the rivets 5 illustrated in FIG. 2 as that of the through-holes 12 of the first annular member 1.

Next, as illustrated in FIG. 1, the one-side axial end face 15 of the first annular member 1 and the other-side axial end face 25 of the second annular member 2 are brought into contact with each other in the axial direction such that the through-holes 12 of the first annular member 1 are aligned with through-holes 22 of the second annular member 2 in the axial direction.

Then, each pipe members 4 is passed through the corresponding through-holes 12, 22 of the first and second annular members 1, 2, the through-holes 12, 22 being aligned with each other in the axial direction. Then, the shaft portion 52 of the rivet 5 is passed through the pipe member 4. Subsequently, the head 51 of the rivet 5 and the distal end portion of the shaft portion 52 are swaged toward the center of the rivet 5. Thus, the head 51 of the rivet 5 is fixed to the one-side axial end face of the second annular member 2. The distal end portion of the shaft portion 52 of the rivet 5 is fixed to the other-side axial end face of the first annular member 1. With this swaging, the head 51 of the rivet 5 is brought into contact with one axial end portion of the pipe member 4. Then, the distal end portion of the shaft portion 52 of the rivet 5 is brought into contact with the other axial end portion of the pipe member 4.

With this swaging, forces for applying a compressive force to the pipe member 4 are applied to the opposite end portions of the pipe member 4 to compress the pipe member 4 in the axial direction, so that the pipe member 4 is expanded in the radial direction of the pipe member 4. Thus, the outer peripheral face of the expanded pipe member 4 presses, like a spring, the inner peripheral faces that define the through-holes 12, 22 of the first and second annular members 1, 2.

As described above, each pipe member 4 is pressed to the inner peripheral faces that define the through-holes 12, 22 of the first and second annular members 1, 2, so that the outer face of the pipe member 4 is engaged with both the inner peripheral face that defines the through-hole 12 of the first annular member 1, and the inner peripheral face that defines the through-hole 22 of the second annular member 2, with a frictional force. In this way, the cage according to the present embodiment illustrated in a schematic sectional view in FIG. 4 is assembled.

Figure 4:
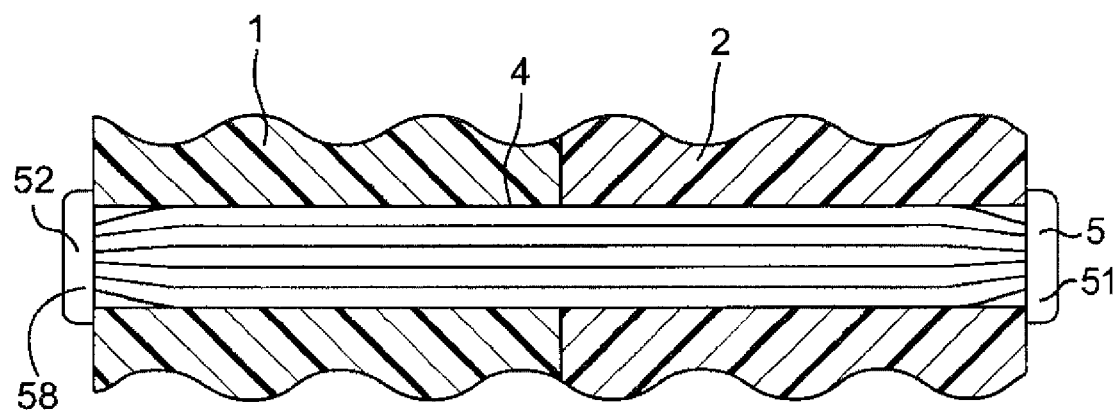
FIG. 4 is a schematic sectional view of the cage according to the embodiment of the invention, which is taken along a plane extending in the radial direction of the cage and passing through the central axis of a through-hole of the cage.

As illustrated in FIG. 2 and FIG. 4, the axial length of the pipe member 4 before expansion in the radial direction is longer than the axial length of the pipe member 4 after expansion in the radial direction. As illustrated in FIG. 4, the head 51 of the rivet 5 constitutes a first fixed portion of the fixed member. A distal end portion 58 of the shaft portion 52 of the rivet 5 constitutes a second fixed portion. The head 51 of the rivet 5 and the distal end portion 58 of the shaft portion 52 of the rivet 5 constitute compressive force applying portions.

According to the foregoing embodiment, the pipe member 4 has the slits 41 that are located at intervals in the circumferential direction. The slits 41 extend in the axial direction and extend through the pipe member 4 in the radial direction. The pipe member 4 applies a force containing a radial component to the inner peripheral faces that define the through-holes 12, 22 of the first and second annular members 1, 2. Thus, the stiffness of the pipe member 4 does not become excessively high. Therefore, even if each pipe member 4 made of metal expands more than the first and second annular members 1, 2 made of resin under a high-temperature environment, no excessively large radial force acts on the first and second annular members 1, 2. As a result, it is possible prevent the situation where the first and the second annular members receive excessively large radial forces and thus excessively high stresses are generated in the first and second annular members 1, 2.

According to the foregoing embodiment, the outer face of each pipe member 4 is engaged with the inner peripheral faces that define the through-holes 12, 22 of the first and second annular members 1, 2, with a frictional force. Thus, a normal force is applied from the outer face of the pipe member 4 to the inner peripheral faces that define the through-holes 12, 22 of the first and second annular members 1, 2. As a result, even if the pipe member 4 made of metal contracts more than the first and second annular members 1, 2 under a low-temperature environment, the force that is applied from the outer face of the pipe member 4 to the inner peripheral faces that define the through-holes 12, 22 of the first and second annular members 1, 2 is reduced just slightly. That is, it is still possible to keep applying the force from the outer face of the pipe member 4 to the inner peripheral faces that define the through-holes 12, 22 of the first and second annular members 1, 2. Thus, it is possible to suppress reduction in a force with which the first and second annular members 1, 2 are coupled to each other under a low-temperature environment. As a result, it is possible to suppress loosening of the engagement between the first annular member 1 and the second annular member 2.

According to the method of assembling the cage in the foregoing embodiment, each pipe member 4 is expanded in its radial direction by compressing the pipe member 4 in its axial direction, so that the pipe member 4 is pressed to the inner peripheral faces that define the through-holes 12, 22 of the first and second annular members 1, 2. Thus, it is possible to restrain an excessively large force from acting on the first and second annular members 1, 2 made of resin under a high-temperature environment. As a result, it is possible to suppress loosening of the engagement between the first annular member 1 and the second annular member 2 under a low-temperature environment.

According to the method of assembling the cage in the foregoing embodiment, each pipe member 4 having an outside diameter smaller than the diameter of the through-hole 12 is passed through the corresponding through-holes 12, 22 of the first and second annular members 1, 2. Then, the pipe member 4 is compressed to press the pipe member 4 to the inner peripheral faces that define-holes 12, 22 of the first and second annular members 1, 2. Because a tension is applied after insertion of the pipe member 4 into the through-holes 12, 22, the pipe member 4 is easily inserted into the through-holes 12, 22 of the first and second annular members 1, 2. This makes it possible to assemble the cage quickly. If such a configuration that a tension is generated during insertion of a pipe member into through-holes is adopted, it is difficult to insert the pipe member into the through-holes. This makes it difficult to assemble a cage quickly.

In the foregoing embodiment, the cage is manufactured by swaging the opposite end portions of each rivet 5 after the rivet 5 is passed through any one of the pipe members 4. Alternatively, in the invention, bolts and nuts may be adopted instead of the rivets. Specifically, a compressive force may be applied to the pipe member as follows. A shaft portion of each bolt is inserted into any one of the pipe members, the nut is screwed to the shaft portion from the distal end of the shaft portion of the bolt, and the nut is fastened toward a head of the bolt. In this modified example, the bolt and the nut constitute the fixed member. The head of the bolt constitutes one of the first and the second fixed portions. The nut constitutes the other of the first and the second fixed portions. The head of the bolt and nut constitute the compressive force applying portions. Each rivet may be swaged only at one end portion.

In the foregoing embodiment, each pipe member 4 is made of metal. Alternatively, in the invention, the pipe member may be made of a material other than metal, such as rubber with a high hardness. Each pipe member may be made of any kinds of steel materials, for example, a stainless steel material such as SUS304, various carbon steels such as S45C, S50C, S55C, S60C, and SUJ2, a spring steel, a case hardening steel, and a high-speed tool steel. However, it is needless to say that each pipe member is preferably made of a rust-resistant steel material.

The timings at which the steps of assembling the cage in the foregoing embodiment are performed are not particularly limited. The steps may be performed at any timings. A plurality of the steps may be performed at the same time. The steps may be performed in the prescribed order. For example, all the pipe members 4 may be passed through the through-holes 12, 22 of the first and second annular members 1, 2 and then the rivets 5 may be passed through the pipe members 4. Alternatively, when some of the pipe members 4 have not been passed through the through-holes 12, 22 of the first and second annular members 1, 2, the rivets 5 may be passed through the pipe members 4 that have been passed through the through-holes 12, 22 of the first and second annular members 1, 2. Further alternatively, after the rivets 5 are passed through the pipe members 4, the pipe members 4 through which the rivets 5 have been passed may be passed through the through-holes 12, 22 of the first and second annular members 1, 2.

In the foregoing embodiment, the cage is a cage of a deep groove ball bearing. Alternatively, the cage according to the invention may be a cage of a ball bearing other than a deep groove ball bearing, such as a cage of an angular contact ball bearing. In the foregoing embodiment, the rolling elements held by the cage are the balls. However, it is needless to say that, in the invention, the rolling elements held by the cage may be rolling elements other than balls, such as tapered rollers, cylindrical rollers, and convex rollers (spherical rollers).

According to the invention, it is possible to provide the cage configured such that high stresses are less likely to be generated in the first and second annular members made of resin under a high-temperature environment, and engagement between the first and second annular members is less likely to be loosened under a low-temperature environment, and to provide the method of assembling the cage.

What is claimed is:

1. A cage comprising:

a first annular member made of resin, having a plurality of through-holes that are located at intervals in a circumferential direction of the first annular member, and having one-side axial end face located on one side in an axial direction of the first annular member;

a second annular member made of resin, having a plurality of through-holes that are located at intervals in a circumferential direction of the second annular member, and having another-side axial end face that is located on another side relative to the one side in the axial direction and that contacts the one-side axial end face of the first annular member;

pipe members each being a single-piece member, and each having a pipe portion that has a plurality of slits that are located at intervals in a circumferential direction of the pipe member, the slits extending in an axial direction of the pipe member and the slits extending through the pipe portion in a radial direction of the pipe member, and the pipe portions being passed through the through-holes of the first annular member and the through-holes of the second annular member; and fixed members each having a shaft portion passed through any one of the pipe members in the axial direction of the pipe member, a first fixed portion that contacts one axial end portion of the pipe member and that is fixed to one-side axial end face of the second annular member, and a second fixed portion that contacts the other axial end portion of the pipe member and that is fixed to the other-side axial end face of the first annular member, wherein an outer face of each of the pipe members is engaged with both an inner peripheral face that defines a corresponding one of the through-holes of the first annular member and an inner peripheral face that defines a corresponding one of the through-holes of the second annular member, with a frictional force.

2. A method of assembling a cage, comprising:

preparing a first annular member made of resin and having a plurality of through-holes that are located at intervals in a circumferential direction of the first annular member, a second annular member that is substantially identical to the first annular member, pipe members each being a single-piece member and each having a plurality of slits located at intervals in a circumferential direction of the pipe member, the slits extending in an axial direction of the pipe member and the slits extending through the pipe member in a radial direction of the pipe member, the number of the pipe members being equal to the number of the through-holes of the first annular member, and fixed members each having a shaft portion that is able to be passed through any one of the pipe members in the axial direction of the pipe member;

inserting the shaft portion of each of the fixed members into one of the pipe members, and compressive force applying portions that are able to apply forces for applying a compressive force to the pipe member, to opposite end portions of the pipe member in a state where the shaft portion is passed through the pipe member, the number of the fixed members being equal to the number of the through-holes of the first annular member;

bringing the one-side axial end face of the first annular member and the other-side axial end face of the second annular member into contact with each other such that the through-holes of the first annular member are aligned with the through-holes of the second annular member in an axial direction of the first annular member;

passing the pipe members through the through-holes of the first annular member and the through-holes of the second annular member that are aligned with the through-holes of the first annular member; and applying the forces for applying the compressive force to the pipe member, to the opposite end portions of each of the pipe members using the compressive force applying portions of a corresponding one of the fixed members so as to compress the pipe member in the axial direction of the pipe member to expand the pipe member in the radial direction of the pipe member, thereby pressing the pipe member to inner peripheral faces that define the through-holes of the first and second annular members, in a state where the pipe members are passed through the through-holes of the first and second annular members, which are aligned with each other after the shaft portions of the fixed members are passed through the pipe members.

* * * * *